Figure 1:
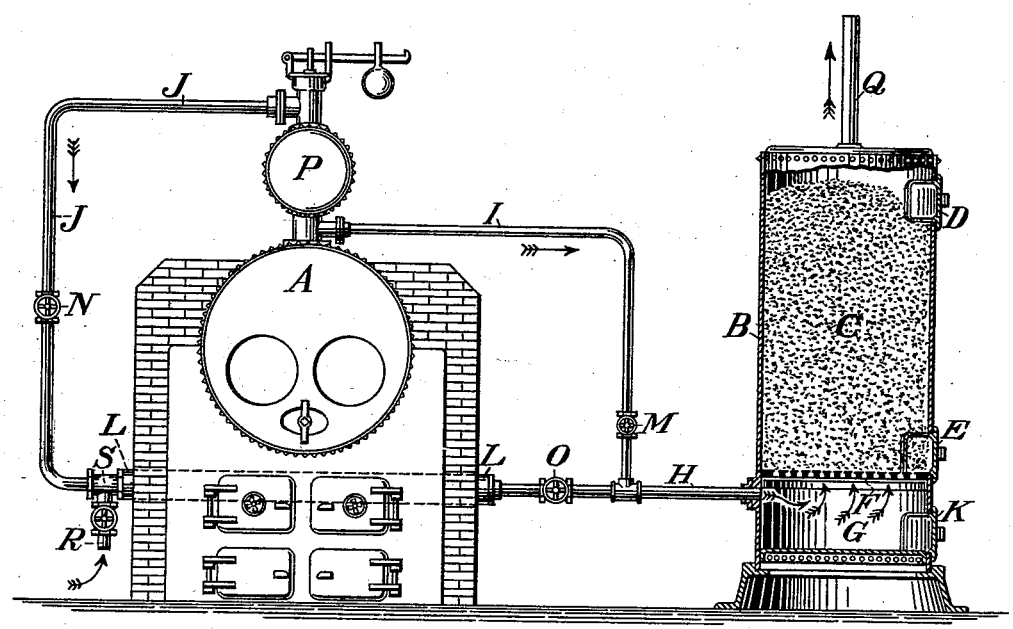

(No Model.)

A. D. SHEPARD.
PROCESS OF PRESERVING FRUITS.

No. 537,313. Patented Apr. 9, 1895.

Witnesses:
E. A. Brandow
Nelson D. Bent Jr.

Inventor:
Abraham D. Shepard
By John Richards
Atty

UNITED STATES PATENT OFFICE.

ABRAHAM D. SHEPARD, OF SAN FRANCISCO, CALIFORNIA.

PROCESS OF PRESERVING FRUITS.

SPECIFICATION forming part of Letters Patent No. 537,313, dated April 9, 1895.

Application filed August 18, 1893. Serial No. 483,477. (No specimens.)

*To all whom it may concern:*

Be it known that I, ABRAHAM D. SHEPARD, a citizen of the United States, residing in the city and county of San Francisco, State of California, have discovered a new and useful Process of Packing and Preserving in a Fresh or Green State Grapes or other Perishable Fruits; and I hereby declare the following specification and drawings herewith to be a full, clear, and comprehensive description of the nature and objects of my improvements and the manner of applying the same.

My invention relates to packing and preserving from decay, fresh or green fruits in such manner as to permit handling and transportation without changing or injuring the flavor thereof, which may be done by surrounding and packing the fruit in comminuted wood or other vegetable fiber, preferably sawdust, that has been bleached, cleansed and deodorized by steam and hot air.

My invention consists in a process of fruit packing by a material as aforesaid, having the gums, oils or resinous matter eliminated therefrom by passing through the material when confined in an inclosed vessel or retort, a current of steam, or superheated steam and air combined, in the manner shown in the drawings herewith, or by other means substantially the same.

In preserving for a time fresh fruit, such as grapes or other of the soft pulp varieties, it has been the custom to pack or surround the fruit with some finely comminuted material, frequently unprepared or raw wood sawdust, but most successfully with what is commonly known as cork cuttings, consisting of comminuted cork tree bark, which is comparatively free from any volatile or fixed substance that would impart undesirable flavor to the fruit, also is soft and will not puncture or bruise the skin of soft fruit. This comminuted cork bark is a foreign product, and by reason of scarcity and cost is not available for fruit packing in this country, and my present invention is, to attain the required property with common, wood sawdust fiber, treated as hereinbefore stated, with heat, moisture and circulation of air, the object being to dissolve and free all gums or oils, wood sap or other impurities that would permeate or in any manner injure the fruit, or flavor thereof when packed therein, also to soften the fiber of the material so that the skins of tender fruit may not be punctured or bruised by the packing.

The function of the packing material is to preserve and protect the fruit by preventing to a certain degree the circulation of air and consequent change of moisture and temperature and keep the fruit segregated one berry or piece from another; also to confine within limits the aroma of fruits that possess that property. Such effect is imparted by treatment herein described.

Another function of the material is the elastic and mechanical support of the fruit in the packages and the avoidance of dense packing giving freedom from the shocks and jars incident to handling and transporting, and such property is also attained by treatment herein described.

While I do not explain every kind of apparatus for treating the packing material or sawdust, it is evident that such apparatus can be varied in many ways and yet produce the same results.

Figure 2:
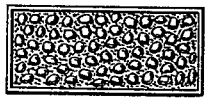

Referring to the drawings: Figure 1 is an elevation, partially in sections, of apparatus for treating or preparing the comminuted packing material according to my invention. Fig. 2 shows a package in section of fruit packed according to my improvements.

A is a common steam boiler and B a chamber or retort for containing the material to be treated. The vessel B is charged with the material C through a door D, which after treatment is removed at a door E.

F is a perforated screen or grating on which the material C rests, permitting the upward passage of steam or steam and air discharged into chamber G by pipe H. This chamber G is provided with a door K, through which can be removed any waste material that may fall through the grating or diaphragm F, also to collect any moisture given off by and descending through the material in the first stages of its treatment. There are two connections from the steam boiler A, one direct by means of the pipes I and H and the other by the pipe J, superheater L and pipe H.

In the first part of the process steam is turned into the vessel or retort B, through the pipes I and H with such moisture contained therein as will occur in drawing the steam from the top of the boiler A. This produces saturation and promotes the first sweating or bleaching process common to the treatment of wood in confined vessels. When the material has been bleached in this manner, the valve M is closed and the valves N and O are opened so that steam will pass from the superimposed drum P through the pipe J and superheater L and thence by the pipe H to the chamber or retort B. Air is introduced at R into the injector S and is by force of the steam and the usual induction nozzle, driven into the superheater L, pipe H and chamber G. The steam being dry in the drum P and with the air further heated and dried in the pipe or superheater L, by such dryness and increased heat soon eliminates the moisture in the material contained in the retort B and expels all volatile matter therein at the waste pipe Q. When the material has been thus bleached, heated and cleaned it is removed at the door E and applied around the fruit in packages as shown in Fig. 2 to preserve the same and protect it in handling and transportation as before explained.

The apparatus thus described, while essential in some form to carry out my invention, is not in so far as construction and arrangement a part thereof, because various devices may be employed for bleaching, heating, cleansing and deodorizing such comminuted material by heat and moisture conveyed by steam or dried steam and air, and may require modification for different kinds of wood or vegetable fiber and for different degrees of fineness thereof. I have therefore shown and described an apparatus for common or general use to aid others in carrying out and applying my invention.

Having thus explained the nature and objects of my invention and the manner of applying same, what I claim as new, and desire to secure by Letters Patent, is—

The herein-described process of preserving fruits, which consists in treating wood sawdust to bleach, cleanse and deodorize the same, by confining the sawdust in a vessel adapted to be closed, passing free steam through the material, following this with dry steam and air to remove moisture, and surrounding the fruit with such bleached and deodorized packing, substantially as set forth.

In testimony whereof I have hereunto affixed my signature in the presence of two witnesses.

A. D. SHEPARD.

Witnesses:
G. A. PARKYNS,
S. H. SMITH.